United States Patent [19]
Parker et al.

[11] Patent Number: 5,909,589
[45] Date of Patent: Jun. 1, 1999

[54] INTERNET BASED TRAINING

[75] Inventors: Lance T. Parker, 907 Burnwood Ln., Houston, Tex. 77073-1202; Lawrence D. Tusoni, Angels Camp, Calif.

[73] Assignee: Lance T. Parker, Spring, Tex.

[21] Appl. No.: 08/753,260

[22] Filed: Nov. 12, 1996

[51] Int. Cl.[6] .................................................. G06F 13/00
[52] U.S. Cl. .............. 395/800.32; 395/186; 395/187.01; 395/188.01; 395/200.57; 395/200.58; 395/200.59; 395/800.37
[58] Field of Search ......................... 395/800.32, 800.37, 395/200.58, 200.59, 200.6, 200.61, 200.62, 186, 187.01, 188.01; 364/DIG. 1

[56] References Cited

U.S. PATENT DOCUMENTS

| | | | |
|---|---|---|---|
| 5,371,794 | 12/1994 | Diffie et al. | 380/21 |
| 5,394,471 | 2/1995 | Ganesan et al. | 380/23 |
| 5,416,842 | 5/1995 | Aziz | 380/30 |
| 5,446,891 | 8/1995 | Kaplan et al. | 395/600 |
| 5,511,122 | 4/1996 | Atkinson | 380/25 |
| 5,535,188 | 7/1996 | Dang et al. | 369/84 |
| 5,557,518 | 9/1996 | Rosen | 364/408 |
| 5,572,643 | 11/1996 | Judson | 395/793 |

OTHER PUBLICATIONS

Harmon, Paul, et al., Expert Systems Tools and Applications, pp. 1–171, John Wiley & Sons, Inc., 1988.
Tuthill, G. Steven, Ed.D., Knowledge Engineering, Chapter 3, pp. 72–132, 1990.
McCartney, Laton, "Virtual MBA", Information Week, Nov. 4, 1996, pp. 33–38.
Stahlman, Mark, "Prisoners To Technology?", Information Week, Dec. 9, 1996, p. 130.
Marly, Kurt, et al., "Interactive Distance Learning Over Intranets", IEEE Internet Computing, Jan.–Feb. 1997, pp. 60–71.
Crenshaw, Dana, 'Net Training, INFOWORLD, Mar. 3, 1997, pp. 61, 62.
Maly, Kurt, et al., Interactive Distance Learning Over Intranets, IEEE Internet Computing, Jan.–Feb. 1997, pp. 60–71.
Shein, Esther, Anywhere, Anytime, PC Week, Mar. 10, 1997, pp. 115, 118.

*Primary Examiner*—Meng-Ai T. An
*Assistant Examiner*—Dzung Nguyen
*Attorney, Agent, or Firm*—Fish & Richardson P.C.

[57] ABSTRACT

A verifier is provided for assessing unique characteristics exhibits by a user over a period of time. The unique characteristics are captured through various interactions with the user over time using a habit capture system which models the user's characteristics when he or she uses a keyboard, a mouse or a digitizer, among others. When the system is first used, the user is prompted to answer various questions, some of which inquire into personal information. As the user responds, information representative of the user is captured, including keyboard typing patterns, mouse click patterns, misspelling patterns, among others. Data captured by the habit capture system is provided to a verifier which samples the user's characteristics and compares the characteristics of the current user with that stored in a database.

20 Claims, 9 Drawing Sheets

INTERNET BASED TRAINING

BACKGROUND OF THE INVENTION

1. Field of the Invention

The invention relates to an apparatus and a method for identity verification, and more particularly, to an apparatus and a method for verifying the identity of a student during one or more computer-based training sessions.

2. Description of the Related Art

The dawn of the microprocessor age has ushered an era with previously unimagined dimensions. Through the enabling technology of the microprocessor, an individual can leverage his or her creative power to perform a wide variety of information-processing tasks that previously had to be assigned to entire departments. Additionally, the networks that made the microprocessor ubiquitous around the world empower the user with a global broadcasting capability. Such technological lever has shifted the traditional power structure from central offices to individuals located in far-flung offices around the world, allowing decisions to be made quicker and more accurately.

The empowerment of the individual by the microprocessor has provided a fundamental and pervasive impact on civilizations. In the past, certain citizens could rely on brute strength as a substitute for formal training or education. However, because a well trained workforce is vital to the growth of nations, the proper training of citizens has significant national implications, for those who fail to train their citizens in technological matters face significant disruptions in their economies, possibly leading to extinction.

As reported in America's popular press, many improvements are needed to sustain the status of America as a world power. In the U.S., higher education remains a labor-intensive service industry made up of fiercely independent and mutually suspicious organizations, each of which jealously guards its expensive and underused facilities. Despite all the tax advantages and private and public subsidies associated with higher education, annual tuition increases have become a hallmark for America's colleges and universities. Furthermore, tuitions are expected to consume ever larger fractions of family budgets, leave so many graduates laden with debt and compel more and more prospective students to select colleges on the basis of cost rather than academic abilities or personal preferences.

Additionally, the U.S. educational system has to overcome a number of other forces that are unrelated to financial burdens. One such force negatively affecting the effectiveness of the school system is the lack of qualified faculties or teachers for classrooms. The U.S. educational system also faces competition in the form of television shows and interactive multimedia games, most of which resort to graphical uses of violence and sex. Given such competition for the students' mind-share, traditional teaching tools such as books and lectures face significant hurdles.

Yet another force that negatively impacts the effectiveness of the educational system is the rigid structure built into our existing educational system. This rigid structure forces students to commute to school, regardless of the relationship of the courses to high traffic time. Additionally, to compensate for the lack of qualified teachers, the average class size has increased. Furthermore, the U.S. educational system rigidly enforces group learning. This herd mentality is sub-optimal, as the more intelligent members of the class are constrained to progress at the average class rate. Thus, the rigidity of our existing educational infrastructure causes a significant amount of time to be wasted in doing things other than learning.

Historically, teachers, professors and educators have for centuries informed and raised awareness of the populace using printed publications such as books and libraries. However, the inexorable march of technology has provided a new arsenal to educators: the computer. Since the sixties, experimental computer-based training systems such as PLATO, executing on Control Data Corporation's mainframes, have appeared. More recently, computer-based educational programs have become available to subscribers and other students with access to a microcomputer and a telephone. Today, existing electronic teaching programs have included video teleconferencing and electronic mail to supplement the more traditional teaching tools such as books. However, the present solutions are not competitive with television shows and interactive multimedia games. Furthermore, due to security issues, present day computer aided instruction systems have been limited to non-credit classes to eliminate the thorny potentials for cheating. Thus, the current solutions require the student to take tests at a central testing facility to minimize incidents of cheating. Although a number of more enlightened universities such as Rice University have deployed an honor code system, such faith in humanity is still not the norm in most universities. Thus, for many universities, requiring students to appear at predetermined test locations is a necessary evil to ensure the sanctity of the grade and the honors bestowed upon the students. This requirement adds unnecessary overhead costs for both the education institution and the student. Furthermore, the requirement reduces the productive time that the student could spend studying instead of taking tests.

SUMMARY OF THE INVENTION

The present invention provides a verifier for assessing unique characteristics exhibited by the user. The unique characteristics are captured through various interactions with the user over a period of time using a habit capture system which models the user's characteristics when he or she uses a keyboard, a mouse or a digitizer, among others. When the system is first used, the user is prompted to answer various questions, some of which inquire into personal information. As the user responds, information representative of the user is captured, including keyboard typing patterns, mouse click patterns, misspelling patterns, among others. A database connected to the habit capture system stores the habits and personal characteristics of the user captured during the initial session.

Subsequently, data captured by the habit capture system is provided to a verifier which is in turn connected to the database. The verifier samples the user's characteristics and compares the characteristics of the current user with that stored in the database. In the event of a variance, the verifier asserts an error signal. The error signal is provided to a lock system which ejects the user out of the application in the event that the verifier indicates a mismatch between the database characteristics and the characteristics of the current user. Alternatively, the error signal can silently generate a warning to the educational institution while allowing the student to continue the session in the event that the verifier indicates a mismatch between the database characteristics and the characteristics of the current user.

In one embodiment of the present invention, a multimedia-based training course is used in conjunction with the verifier for insuring the integrity of the student testing process. In this embodiment, a portion or the entire course material is encrypted and placed onto a recordable medium such as a compact disk read only memory (CD-ROM) with sufficient storage to support video and multimedia graphics rivaling that of interactive video games. A menu system is provided to allow the student to browse specific topics. Furthermore, the students can fast forward and reverse each chapter as necessary to ensure a complete comprehension of the course material. Thus, by automating the educational process, the present invention minimizes the resource drain on educators as well as administrative assistants in administering the course.

In this embodiment, the profiler propounds a list of questions highly specific to the student during the first session such only that student could be expected to answer those questions correctly in the future. These queries include the telephone number and other personal information which is very familiar to the student and to which a predictable keystroke pattern response can be expected. Additionally, while the student learns his or her material, the verifier runs silently in the background to collect the appropriate student characteristics. During the test periods, the present invention monitors the user's characteristics and compares the user's unique characteristics with that stored in a database. In the event of a mismatch, the present invention either cancels the test-taking session and/or generates a warning to the educational institution. Alternatively, in the event that the user's characteristics match the characteristics in the database, at the end of the course, the present invention generates the appropriate grade and provides a report of the appropriate statistics to the educational institution.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
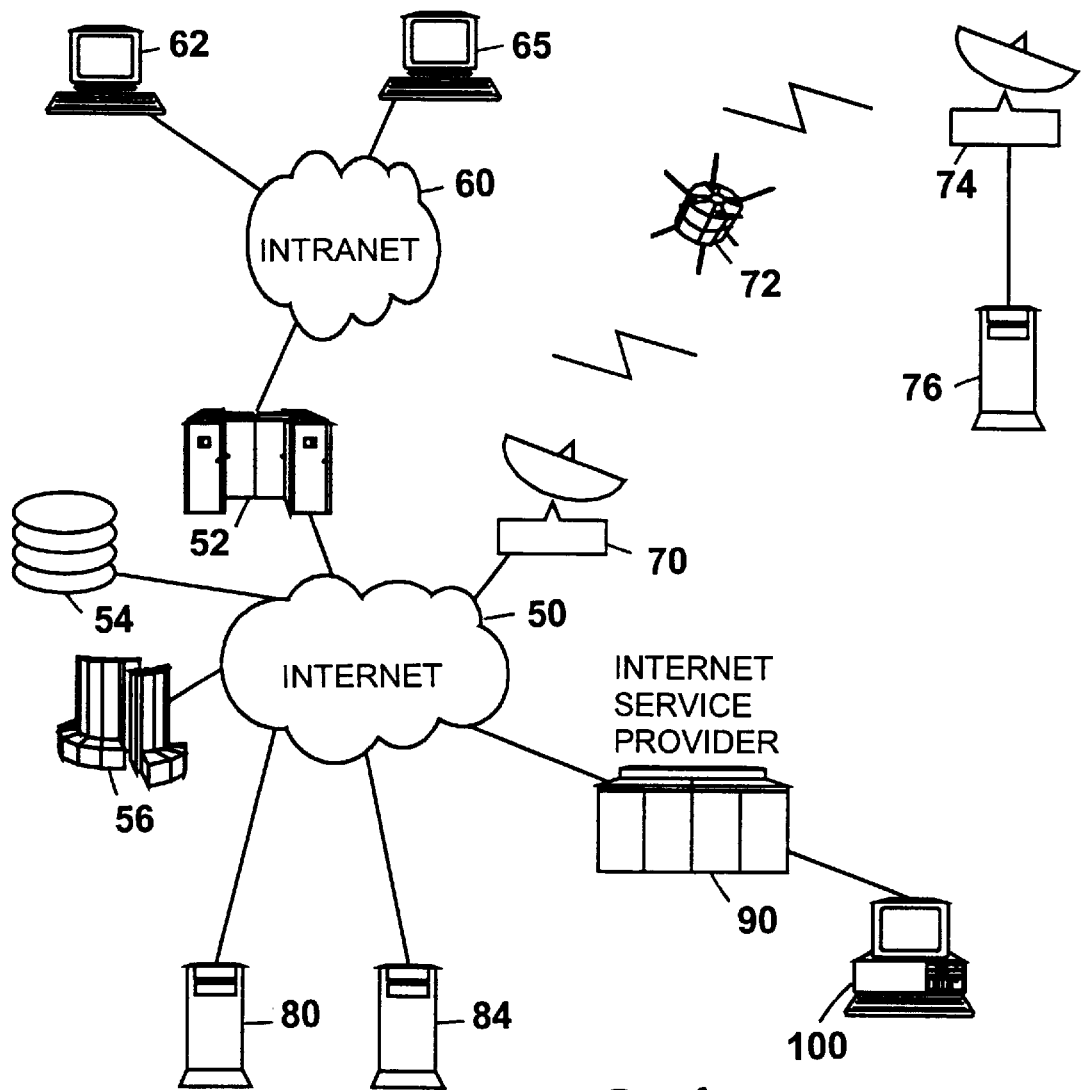
FIG. 1 is a block diagram illustration of a communication architecture over the Internet for the present invention.

Turning now to FIG. 1, the environment and the communications network in which the present invention is practiced is shown. In FIG. 1, an Internet 50 provides the communication backbone for the present invention. The Internet 50 is a network linking other networks. As a progeny of a U.S. Department of Defense project to link military and research computer systems in a fail-safe network to prevent a single nuclear strike from disabling all military computer capability, the Internet 50 grew into a super-network interconnecting computers at universities, government/military offices, and research centers around the world.

The primary elements of the Internet 50 are host computer systems that are linked by a backbone telecommunications network. The network is similar to a special purpose telephone line that is always open and talking to host computers. A system of advanced protocols tells these computers how to locate and exchange data with one another, passing information from computer to computer as the system seeking information reaches the system that houses the desired data. Packets of information are detoured around nonoperative systems if necessary, until the information finds its way to the proper destination.

Preferably, the computers communicate over the network using the same language or protocol called transmission control protocol/Internet protocol (TCP/IP). Furthermore, although some computer networks may not provide TCP/IP capability, they may still communicate with the Internet 50 through one or more gateways that can actually be a host that passes certain types of data such as e-mail between networks. Additionally, although not shown, the present invention contemplates that multiple networks can be linked together and connected to the Internet 50 via a hub that enables computers on these networks to talk to one another and to other computers elsewhere on the Internet 50.

The Internet 50 has proved to be a remarkable way for people to communicate and share information. However, in its native form, the interface of the Internet 50 is so nonintuitive that only computer specialists could navigate the Internet 50. To overcome this problem, a World-Wide Web (WWW) is distributed across thousands of host computers attached into the system's communications network. The World-Wide Web is simply a series of communications of protocols representative of information in documents that could be linked to other documents and stored on computers throughout the Internet. Users of the Internet 50 could access documents or pages via a program called a browser. Although early browsers were text-only, today's browsers offer windows-based icons, pull-down menus, bit-map graphics and colorful links to display hyper-text documents. The graphical Web browser thus supports an information revolution and a cultural phenomenon. Like other distributed applications, the Web is based on the client/server model, in which Web pages reside on host computers, such as a database server 76, 80, or 84 that "serve up" pages when a local computer such as the personal computer 100 requests them.

In addition to the Internet 50, an Intranet 60 also exists. The Intranet 60 is one variation of the Internet 50 for large organizations such as corporations and universities, which offers graphics capability and e-mail that enables collaboration as well as communication among geographically dispersed divisions. The Intranet 60 is connected to the Internet 50 via a mainframe 52. Additionally, a plurality of workstations or terminals 62 and 65 are connected to the Intranet. Thus via the Intranet 60 and the mainframe 52, the workstations or terminals 62 and 65 can access the Internet 50. The availability of Internet 50 and Intranet 60 access provides companies and large organizations the ability to distribute information more efficiently by allowing different information systems and databases to be interconnected.

In addition to the mainframe 52, a number of other devices can be attached to the Internet 50. For instance, a large capacity disk array 54 may be linked to the Internet 50 to store historical information in the database until response to queries is directed at the database on the disk array 54. Additionally, a supercomputer 56 may be attached to the Internet 50. The supercomputer 56 provides high speed hardware for compute intensive applications which may be accessed on an as-needed basis.

Furthermore, although the mainframe 52, the disk array 54 and the mainframe 56 are connected to the Internet 50 via high speed land lines such as T1 or T3 lines, other communication s media are available as well. For instance, a satellite dish 70 is connected to the Internet 50 to provide an uplink via a satellite 72 to a remote microwave receiver 74 on the downlink. The antenna station 74 in turn is connected to a server 76 to provide a wireless link between the server 76 and the Internet 50.

Additionally, a plurality of ProEd servers 80 and 84 are also connected to the Internet 50. The ProEd server 84 is a mirror server of the ProEd server 80. Both servers 80 and 84 are preferably Windows NT™ based servers, available from Microsoft Corporation of Redmond, Wash. Additionally, ProEd servers 80 and 84 operate under a Wolfpack mode of Windows NT™ to ensure reliability. The Wolfpack mode ties together servers 80 and 84 with failover capability and basic system monitoring software. Servers 80 and 84 contain authentication codes to be accessed by the user computer as well as student performance profile information and specific course-in-progress information.

Furthermore, a personal computer 100 is provided to allow the student to study and take examinations on-line. The personal computer 100 is connected to the Internet 50 via an Internet Service Provider (ISP) 90. Typically, the ISP 90 is connected to the Internet 50 via a T1 connection. Furthermore, the ISP 90 has a rack of modems that accepts multiple incoming calls simultaneously. The connection from the personal computer 100 is complete when it reaches the host computer, which in this case is the database server 80 or 84. The host computer database server 80 or 84 runs a Web server and other TCP/IP software which reads requests sent from the client computer 100 and retrieves and sends the client computer 100 the appropriate information stored on the host database server 80 or 84. These host computers may have dedicated T1 or T3 links to the Internet 50 backbone, or may be connected to the backbone through a network of hosts. Alternatively, the host computer 80 or 84 may be connected to the Internet 50 via a gateway. The gateway or router passes data packets to the wired world and is the interface between the network and the host application. Conceptually, the gateway acts as an independent network driver to insulate the application from the need to know which particular interface is to be utilized with a particular network. Additionally, the router or gateway opens up the "envelope" of each message, whether inbound or outbound, and forwards it to the appropriate destination. In this function, the gateway is concerned mainly with the message flow control. The main function of the gateway is to transfer data from one data protocol to another, and to control the length on which the data is communicated. This includes control and management of the complete TCP/IP protocol stack. Furthermore, additional gateways are provided through a Serial Line Internet Protocol (SLIP) or a point-to-point protocol (PPP) sub-network layer interface. SLIP is a simple packet formatting facility which allows IP packets to be transferred from one device to another across a point-to-point link. SLIP operates by attaching delimiter bytes to the beginning and end of the packet and escape bytes within the packet, to assure that the delimiter byte does not occur within the packet.

Further, the ISP 90 is linked to the personal computer 100 via a wide area network, including analog lines, integrated services data network (ISDN), and cable. The ISP 90 can communicate and interact with the personal computer 100 using a plurality of protocols and/or languages, including Java and Visual Basic. Java is an object oriented programming language develop by Sun Microsystems. Modeled after C++, the Java language was designed to be small, simple and portable across platforms and operating systems, both at the source and at the binary level. Platform independence is one of the most significant advantages that Java has over other programming languages. At the source level, Java's primitive data types have consistent sizes across all development platforms. Java's foundation class libraries make it easy to write code that can be moved from platform to platform without the need to rewrite it to work with a new platform. At the source level, Java's primitive data types have consistent sizes across all development platforms. Java's foundation class libraries make it easier to write code that can be moved from platform to platform without a need to customize the application to the platform. Via Java, the Internet 50 becomes an intelligent mechanism for loading and updating materials to the user of the computer 100.

Figure 2:
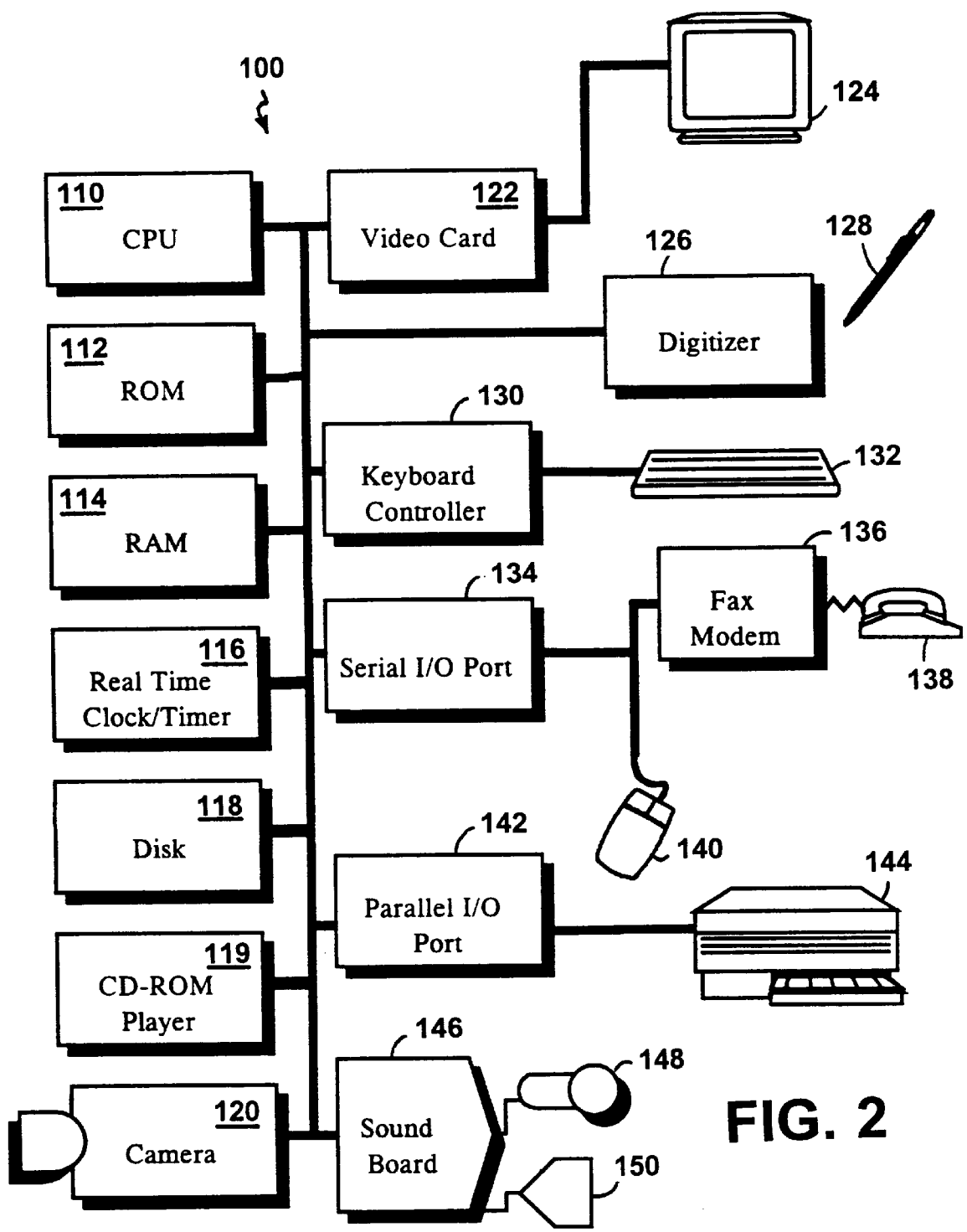
FIG. 2 is a block diagram of a computer in accordance with the present invention.

The personal computer 100 is suitably equipped with a modem, a browser software, communications software, and a software package from ProEducational International Inc. of Cypress, Tex., as further illustrated in FIG. 2. Furthermore, the computer 100 accepts the course material in the form of one or more diskettes or CD-ROMs from the user and performs the subsequent log-on process. Referring now to FIG. 2, a more detailed block diagram of the computer 100 of FIG. 1 is shown. The computer of system 100 is preferably capable of supporting multimedia data streams. Multimedia refers to the integration of text, audio, graphics, still image, and moving pictures into a single computer-controlled product and includes the combination of computers, video or compact disc players, video monitors, optical scanners, audio cards, music synthesizers, etc., all integrated through software. These applications typically require the portable computer to support a large capacity disk drive and a CD-ROM (Compact Disk Read-Only-Memory) player on-board.

Turning now to FIG. 2, a central processing unit (CPU) 110 provides processing power for the computer system 100. The CPU 110 is preferably an Intel Pentium® processor, although a number of other microprocessors may be used, including a PowerPC microprocessor, an R4000 microprocessor, a Sparc microprocessor, or an Alpha microprocessor, among others. The CPU 110 is connected to a read only memory (ROM) 112. The ROM 112 provides boot codes such as a system BIOS software that boots up the CPU 110 and executes a power up self test (POST) code on the computer system 100.

In addition, the CPU 110 is connected to a random access memory (RAM) 114. The RAM 114 allows the CPU 110 to buffer instructions as well as data in its buffer while the computer 100 is in operation. The RAM 114 is preferably a dynamic RAM array with 32 megabytes of memory. In addition, the CPU 110 is also connected to a real time clock and timer 116. The real time clock and timer 116 stores the dates and time information for the CPU 110. Furthermore, the real time clock and timer 116 has a lithium backup battery to maintain the time information even when the computer system 100 is turned off.

The CPU 110 is also connected to a disk storage device 118. The disk storage device 118 stores executable codes as well as data to be provided to the CPU 110. Additionally, the CPU 110 is connected to a CD-ROM drive. Typically, an IBM PC compatible computer controls the disk drive 118 and the CD-ROM player 119 via an Intelligent Drive Electronics (IDE) interface. IDE drives were originally developed to be software compatible with an ST-506 compatible disk drive controller such as the WD-1003 manufactured by Western Digital Corporation. As the ST-506 standard supports two disk drives, the IDE interface also supports two drives which are referred to as master/slave drives. As both drives are mapped to the same location, each drive must monitor a set of interface registers known as a task file register and respond only when that drive is selected by the select drive bit (SDB) register.

In a standard IBM compatible personal computer, the Basic Input/Output System (BIOS) software supports a primary IDE channel interface having a number of I/O ports accessible via the task file interface: 0x01F0h (data port, 16 bits), 0x01F1h–0x01F7h (command and status port, 8-bit access only), and 0x03F6h–0x03F7h (reset drive and alternate status, 8-bit access only). Additionally, a second channel with IDE ports located at 0x0170h–0x01Fh and 0x0376h–0x0377h is supported by the standard BIOS. To individually select the register ports, each channel provides chip select signals CS1 to decode registers located at I/O addresses 0x01FXh and 0x017Xh of the task file register and CS3 to further decode the data and control registers residing at I/O addresses 0x03F6h–0x03F7h and 0x0376h–0x0377h of the task file register. In this manner, the standard BIOS supports two IDE channels with separate pairs of CS1 and CS3 signals.

Additionally, the CPU 110 is connected to a video camera 120. The video camera 120 supports video conferencing between the students and the educator. Furthermore, the video camera 120 can also capture a picture of the student as he or she takes the test for authentication purposes. The video camera 120 essentially consists of a lens, a charge-coupled-device (CCD) array, and an analog to digital converter. The lens focuses photons onto the CCD array, which generates voltages proportional to the photons. The analog voltages generated by the CCD array is converted into a digital form by the analog to digital converter for processing by the CPU 110.

The CPU 110 is also connected to a video card 122. The video card 122 has a character generator and a video RAM built in. If a certain character is to be displayed in text mode, the CPU 110 only needs to pass the number of the code of this character to the graphics control chip on the video card 122. The video RAM holds data or codes that determine the character to be displayed on the screen. The job of the character generator is to convert this code into a corresponding pattern of pixels so that the character can be displayed onscreen by the graphics control chip. Alternatively, in the graphics mode, the video RAM is read directly and the character generator is not enabled. On the back of the video card 122 is one or more jacks. Connectors for monochrome and red, green, blue (RGB) monitors can be plugged into the jacks. The connectors, which are adapted to be plugged into the jacks of the video card 122, eventually are connected to the input of a monitor 124 to be displayed.

The present invention also supports a pen-based user interface. A digitizer 126 is connected to the CPU 110. Additionally, a pen 128 is provided to allow the user to write or sign his or her signature. The pen 128 and digitizer 126 in combination support another mode of data entry. Furthermore, a signature verification routine can receive the pen data entry to ensure that the student is the test taker.

While the video monitor 124 receives the output signals from the CPU 110 to the user, a keyboard 132 is connected to a keyboard controller 130 for providing input information to the CPU 110. Thus, the user can type instructions and commands into the keyboard 132 for subsequent execution or analysis by the CPU 110. Additionally, one or more serial input/output (I/O) ports 134 are provided in the computer system 100. Connected to the serial I/O ports 134 are a plurality of peripherals, including a mouse 140 and a facsimile modem 136. The facsimile modem 136 in turn is connected to a telephone unit 138 for connection to the Internet service provider 90. Via the modem 136, the personal computer 100 accesses the telecommunications connection line until it reaches a telephone company's central office. The central office routes the calls either through its own network of copper, fiber optic, or satellite links to a long-distance carrier's point of presence. The call is then routed to the central office nearest the Internet service provider 90 (FIG. 1).

A fast modem is essential for cruising the World-Wide Web. Preferably, the modem 136 is a 28.8 kilobits per second modem that converts information from the computer into analog signals transmitted by ordinary phone lines or plain old telephone service (POTS). Alternatively, the modem 136 could connect via an integrated service digital network (ISDN) line to transfer data at speeds up to 128 kilobits per second. On receipt of a call, the ISP 90 processes the request, passes the connection to its leased line link to a computer such as the database server 80 or 84 on the Internet 50.

Furthermore, a parallel input/output (I/O) port 142 is provided to link to other peripherals. Connected to the parallel I/O port 142 is a laser printer 144. Additionally, to capture and verify the voice characteristics of the test taker, a microphone 148 is connected to a sound board 146 which eventually provides the results to the CPU 110 for immediate processing or to a disk drive 118 for offline comparison with the file on the server 80 or 84. The sound board 146 also drives a music quality speaker 150 to support the multimedia-based training software. As multimedia programs use several medium, the multimedia educational system of the present invention integrates the hardware of the computer system 100 of the present invention. For example, the sound cut is used to play sound, the monitor 124 is used to display movies and the CD-ROM player 119 is used to play CD quality audio to enhance the learning experience of the student. In this manner, sounds, animations, and video clips are coordinated to make the computer-aided training more friendly, usable and interesting.

Figure 3A:
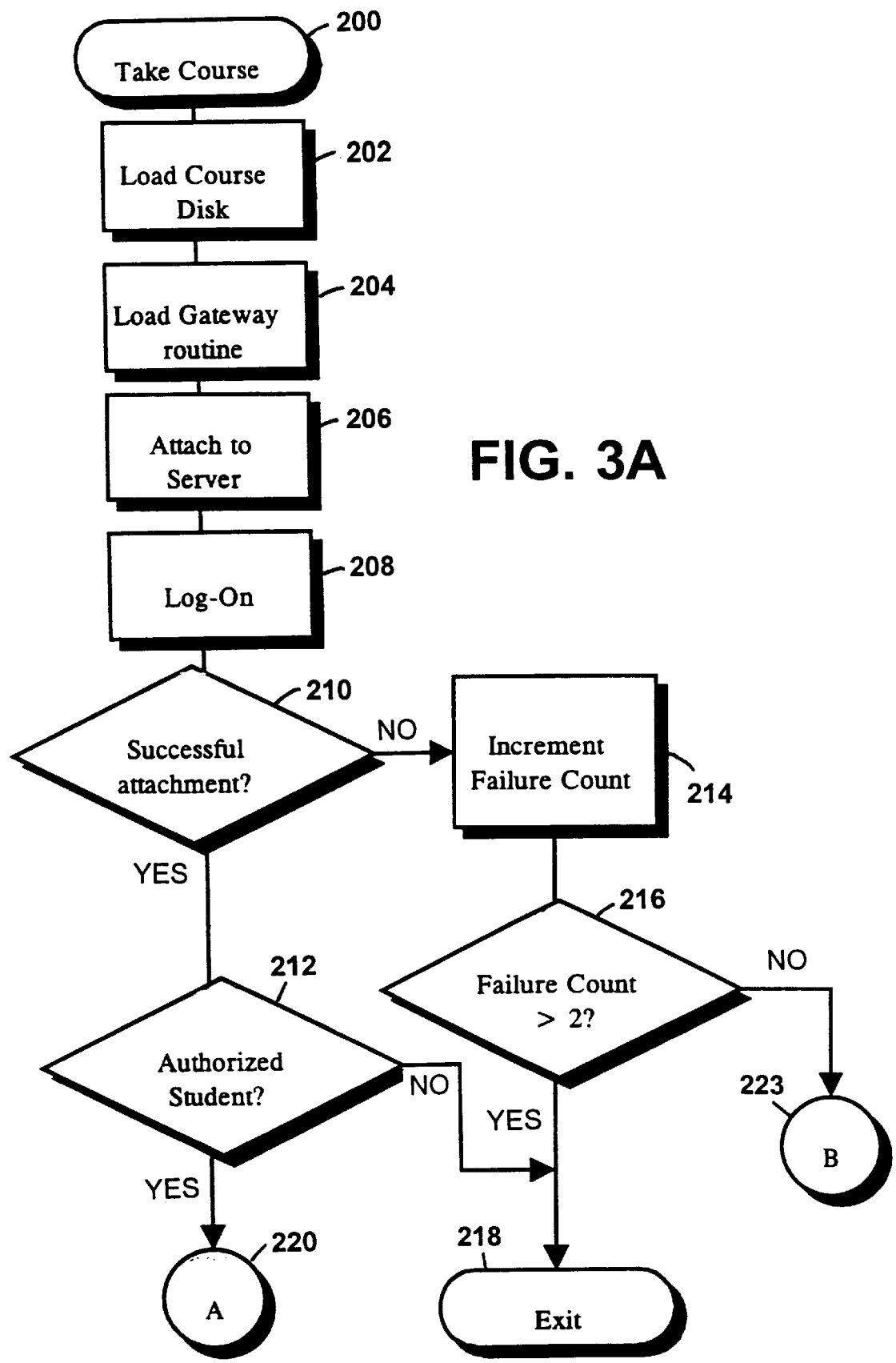
FIG. 3A is a flow chart illustrating in part the computer-based training process of the present invention.
Figure 3B:
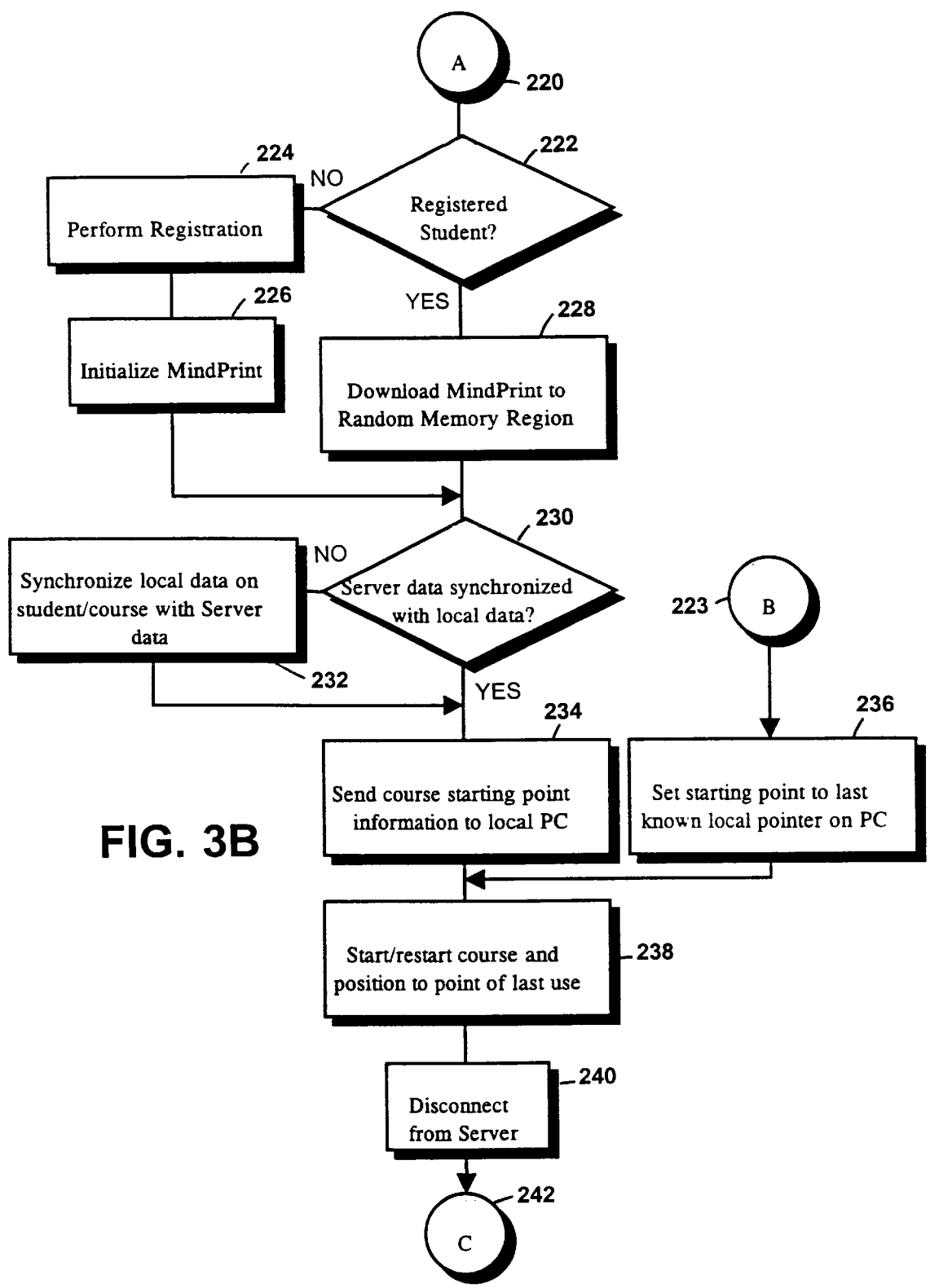
FIG. 3B is a continuation flow chart of FIG. 3A illustrating the MindPrint initialization and course restarting process in accordance with the present invention.
Figure 3C:
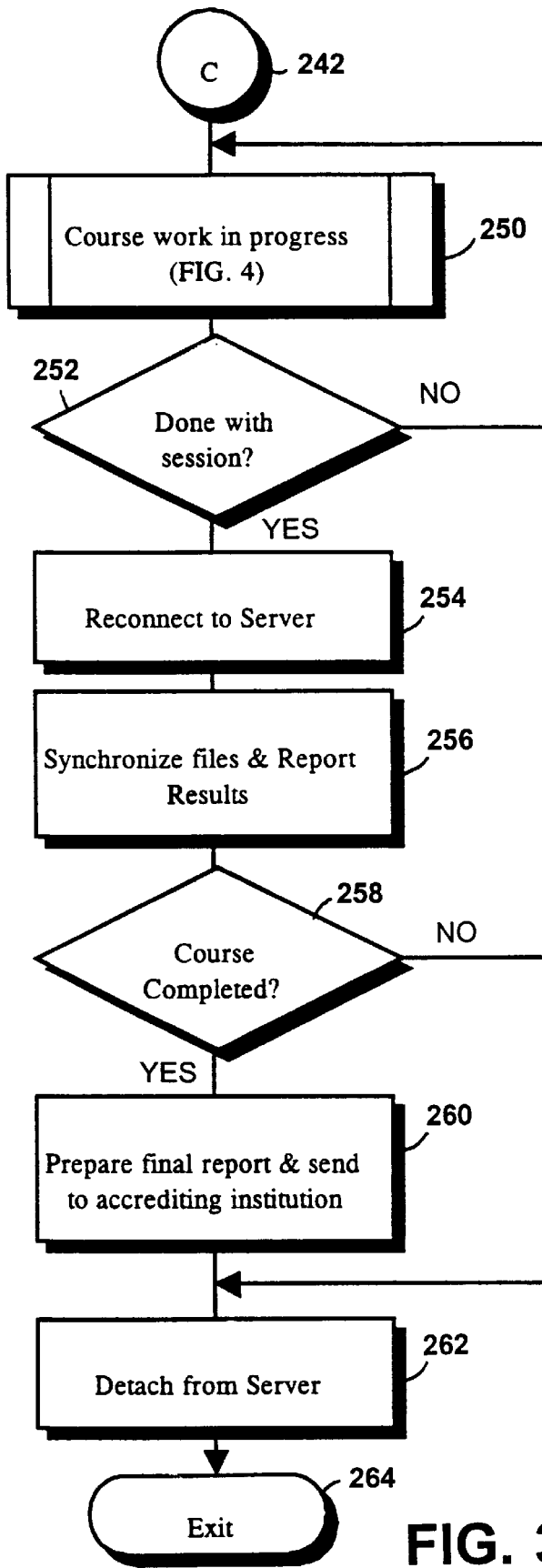
FIG. 3C is a continuing flow chart of FIGS. 3A and 3B illustrating events in taking the course on the computer in accordance with the present invention.

Turning now to FIGS. 3A, 3B and 3C, the process to perform computer-aided training and test-taking of the present invention is shown schematically. In the present invention, the course material could be stored on a high density floppy disk, or preferably a CD-ROM. The disk or CD-ROM containing the course material may be encrypted in whole or in part. From step 200 of FIG. 3A, the routine reads the course material from the CD-ROM player 119 in step 202. Once the student has loaded the CD-ROM in the CD-ROM player 119 in step 202, the software on the CD-ROM loads a gateway or a supervisor program up in step 204. The supervisor loaded in step 204 then takes over control of the computer to ensure the integrity of the learning and test-taking process. From step 204, the supervisor dials the Internet 50 via the Internet service provider 90. In step 208, the supervisor attaches to one of the servers 80 or 84 over the Internet 50. Next, the student signs on in step 208.

From step 208, in the event that a successful attachment is made to the servers 80 and 84 over the Internet 50, the routine of FIG. 3A proceeds to step 212 where it checks to see that the student is an authorized student. In the event that the student is authorized in step 212, the routine of FIG. 3A proceeds to step 220 via a connector A.

From step 210, in the event that the attachment failed, a failure count is incremented in step 214. Next, the routine of FIG. 3A checks to see if the failure count is greater than 2 in step 216. If so, the routine exits in step 208 so as to require that the student actually signs on. From step 216, in the event that the failure count is less than 3, the routine proceeds to step 223 via a connector B. This process allows the student to work even though in certain periods access to the Internet 50 might not be available. Similarly, in the event that the student is not authorized in step 212, such as when he or she is not enrolled in the course, the routine of FIG. 3A exits via step 218.

Turning now to FIG. 3B, the continuation of step 200 of FIG. 3A is continued. In FIG. 3B, from the connector A, the routine proceeds to step 222 where it checks to see whether the student has been registered. If not, the routine proceeds from step 222 to step 224 where it performs the registration. This process essentially involves asking the student a series of personal questions that only the student is expected to know on the spot. Furthermore, during the registration process, the routine collects a plurality of identifying imprints captured electronically such as the keyboard typing rate, the mouse typing rate and common errors generated. This information is subsequently used to initialize the MindPrint database in step 226. From step 226 the routine proceeds to step 230.

Alternatively, from step 222, in the event that the student has already been registered, the routine proceeds to step 228 where it downloads the MindPrint database to a RAM memory region. The storing of the MindPrint information in a random memory region prevents possible knowledgeable programmers from retrieving and defeating the security and verification processes of the present invention.

From step 226 or step 228, the routine checks to see if the server data has been synchronized with the local data in step 230. If not, the routine proceeds to step 232 where it synchronizes the local data on the student or the course with the server data. In this manner, in the event that the course material pointers on the local computer differ from that of the server, or in the event that new course material needs to be downloaded to update the materials present on the CD-ROM, the local computer disk is updated.

In the event that the server data is synchronized with the local data in step 230, or after the synchronization of step 232, the routine proceeds to step 234 where it sends course starting point information to the local personal computer 100.

Alternatively, in the event that the failure count is less than 3 in step 216, the routine proceeds via connector B to step 236 where it sets the starting point to the last known local pointer on the personal computer 100. Next, from step 234 or step 236, the routine of FIG. 3B starts or restarts the course and positions the pointer to the last point of use in step 238. Next, the routine disconnects from the server 80 or 84 in step 240. In this manner, the student can operate the computer without relying on speed or load problems on the Internet 50.

Turning now to FIG. 3C, from connector C, the routine proceeds to step 250 where the student uses the material supplied on the CD-ROM in completing his or her course work. The processes involved in step 250 are described in more detail in FIG. 4. From step 250, the routine checks to see if the student has completed his or her session in step 252. If not, the student is allowed to continue studying in step 250. Alternatively, in the event that the student is done with the session in step 252, the routine proceeds to step 254 where it reconnects to the server 80 or 84 over the Internet 50.

From step 254, the routine of FIG. 3C then synchronizes its files and reports its results to the database stored in the server 80 or 84. From step 256, the routine checks to see if the student has completed the course materials supplied on the CD-ROM 250. If so, the routine prepares the final report and sends the report to an accrediting institution in step 260. Alternatively, in the event that the course has not been completed in step 258, or in the event that the course was completed and the final report was prepared and sent to the proper authorities in step 260, the routine proceeds to step 262 where it detaches from the server 80 or 84 before it exits the training process in step 264.

Figure 4:
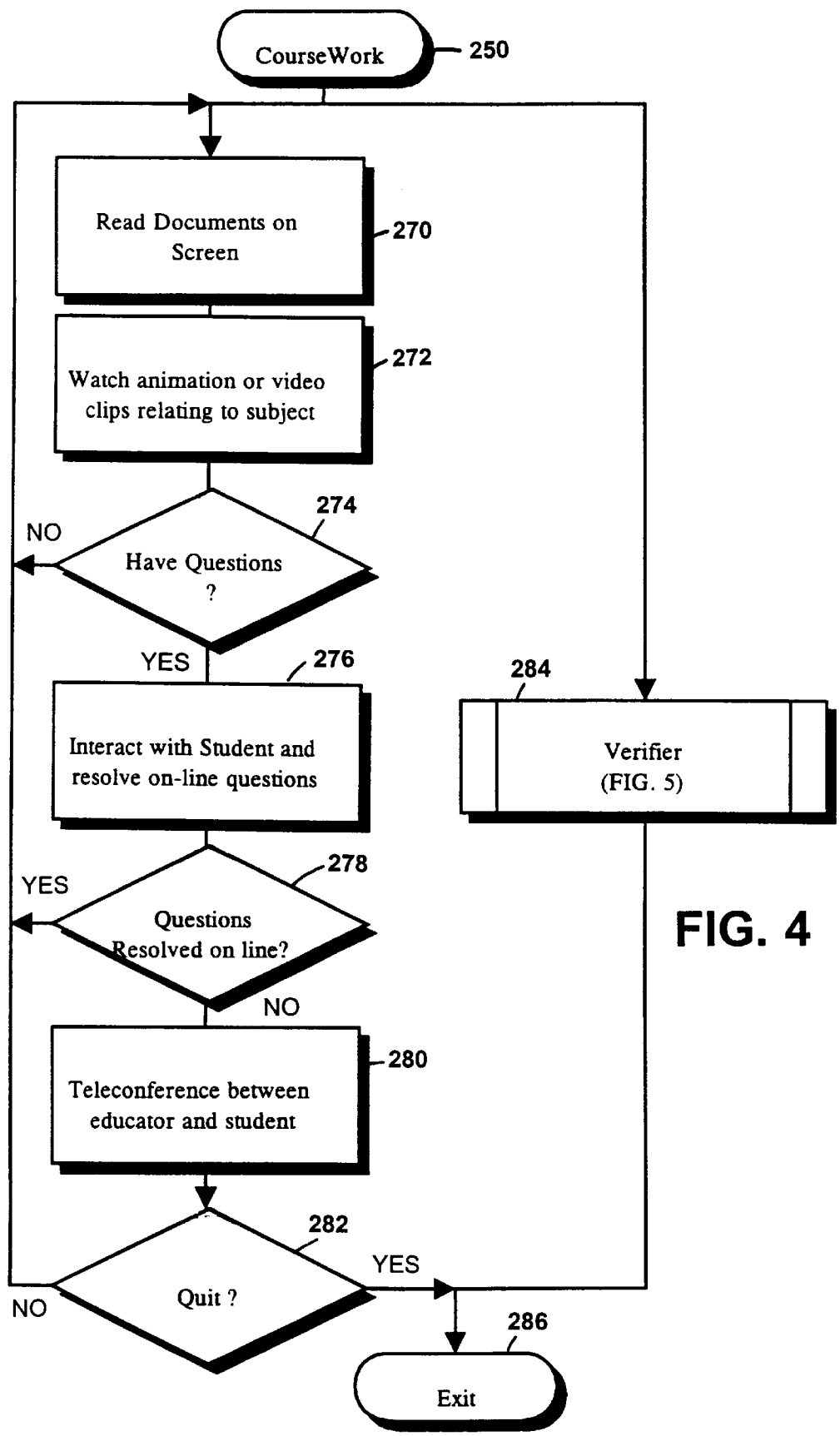
FIG. 4 is a flow chart illustrating in more detail the course work step of FIG. 3C.

Referring now to FIG. 4, the process for completing the course work supplied in the CD-ROM is shown in more detail. From step 250, the routine supplies documents and graphics materials on the screen 124 of the personal computer 100. Furthermore, to make the course material as interesting as video games, the training routine of the present invention provides multimedia information in the form of animation or video clips relating to the subject in step 272. After the student has had a chance to review the documents and watch the animation or video clips relating to the subject, the student may have questions relating to the subject matter of the CD-ROM. Thus, in step 274, in the event that the student does not have any questions, the routine simply loops back to allow the student to read additional documents or watch animations or video clips on more advanced topics.

Alternatively, in the event that the student has questions in step 274, the routine interacts with the student in step 276 and attempts to resolve the questions on-line. However, because the database on-line is rather limited and is not as flexible as the educator, in the event that the questions cannot be resolved on-line in step 278, a teleconference is arranged between the educator and the student in step 280. Next, from step 280, in the event that the student wishes to stop the current session, the routine exits in step 286. Alternatively, the routine loops back to allow the student additional time to review existing material or to move on to more advanced materials. Thus, the computer-aided training system of the present invention allows the student to proceed at his or her own pace and remove the rigid structure that traditional education systems impose.

Figure 5:
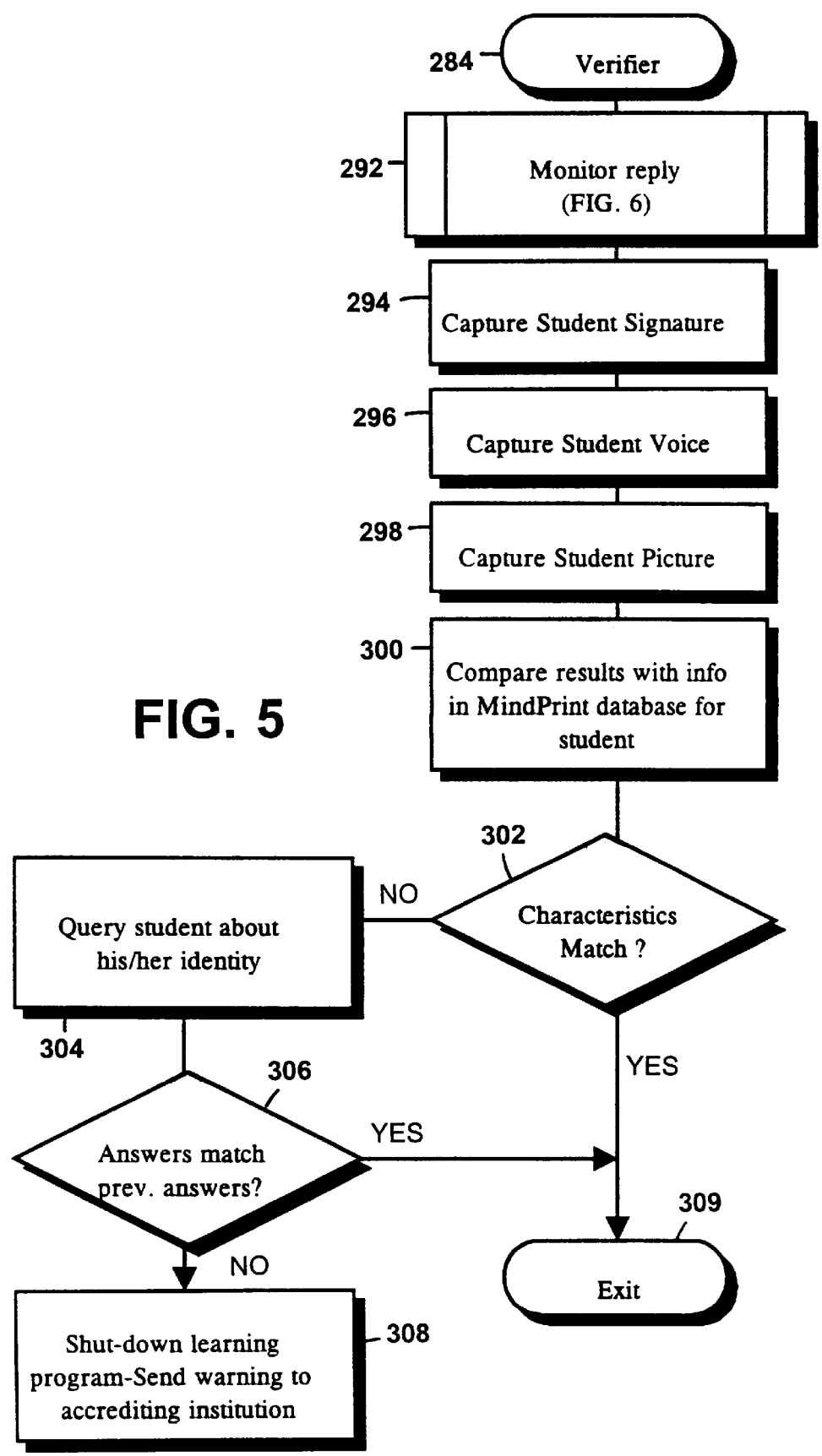
FIG. 5 is a flow chart illustrating in more detail the verifier of FIG. 4.

In parallel, while the student is reviewing his or her course material on the CD-ROM, a verifier 284 runs silently in the background to check the identity of the student. The verifier 284 is illustrated in more detail in FIG. 5. Referring now to FIG. 5, from step 284 the verifier of the present invention monitors the student's reply via conventional data entry methods such as keyboard and mouse, as shown in more detail in FIG. 6. From step 292, the present invention also captures the student's signature in step 294 via the digitizer 126, if one is available. Additionally, from step 294, the routine proceeds to step 296 where it captures the student's voice using the microphone 148 and a soundboard 146 as appropriate. Additionally, in step 298 the routine captures the student's picture via the video camera 120. This information is correlated with the information stored in the MindPrint database for the respective student in step 300.

The identity analysis process can be performed using a number of methods. One method based on expert system technology, called expert control or intelligent control, acquires the knowledge of an expert investigator who can estimate with great accuracy the identity of an individual based on his or her peculiar patterns. Based on the knowledge base of the expert system, the expert system software can adjust the identification control strategy after receiving inputs on changes in the data entry.

One drawback of the expert system is that, as the expert system depends heavily on a complete transfer of the human expert's knowledge and experience into an electronic database, it is difficult to produce an expert system capable of handling the dynamics of a complex system. Recently, neural network based systems have been developed which provide powerful self-learning and adaptation capabilities to cope with uncertainties and changes in the system environment. Modeled after biological neural networks, engineered neural networks process training data and formulate a matrix of coefficients representative of the firing thresholds of biological neural networks. The matrix of coefficients are derived by repetitively circulating data through the neural network in training sessions and adjusting the weights in the coefficient matrix until the outputs of the neural networks are within predetermined ranges of the expected outputs of the training data. Thus, after training, a generic neural network conforms to the particular task assigned to the neural network. This property is common to a large class of flexible functional form models known as non-parametric models, which includes neural networks, Fourier series, smoothing splines, and kernel estimators. The neural network model is suitable for modeling complex identification processes due to its ability to approximate arbitrarily complex functions. Further, the data derived neural network model can be developed without a detailed knowledge of the underlying steps, in contrast with those in expert systems. Additionally, fuzzy-based comparators can be used in step 300 to identify the individual. Fuzzy comparators essentially provide a range of inputs where the individual's data entry can vary in pattern without affecting the identification of the individual.

Figure 6:
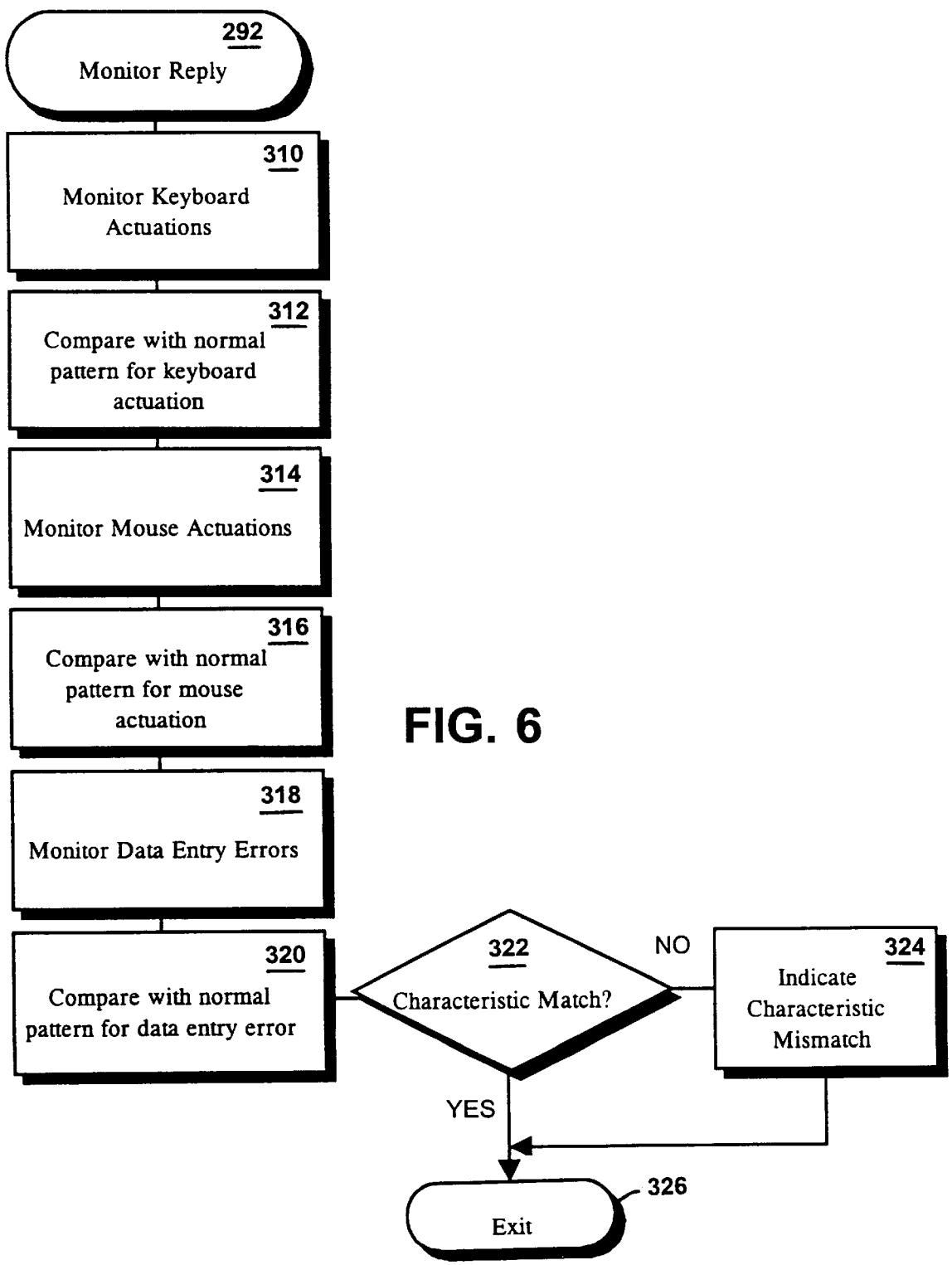
FIG. 6 is a flow chart illustrating in more detail a monitor reply step of FIG. 5.

From step 300 of FIG. 6, if the characteristics do not match in step 302, the routine proceeds to step 304 where the student is probed with questions to identify his or her identity. Next, from step 304, the routine checks to see if the responses from the student match the previous answers in the initial session, as discussed in more detail in FIG. 7. From step 306, in the event that the answers do not match, the routine of FIG. 5 either shuts down the learning program in step 308 and/or generates warnings to the accrediting institution in step 308. Thus, the routine can silently generate a warning to the educational institution while allowing the student to continue the session in the event that the verifier indicates a mismatch between the database characteristics and the characteristics of the current user. From step 302 or 306, in the event that the answers match the responses provided during the initial session, the routine does not generate any alarm and simply exits in step 309.

Turning now to FIG. 6, the monitor reply step 292 is shown in more detail. In FIG. 6, from step 292, the routine monitors keyboard actuations in step 310. Next it compares the keyboard actuations with a normal pattern for keyboard actuations in step 312. The normal patterns for keyboard actuation is accumulated over time to accurately reflect the data entry characteristics of the student. Additionally, from step 312, the routine proceeds to step 314 where it monitors mouse actuation.

Next, in step 316, the routine compares the user's current match mouse actuations with the normal pattern for mouse actuations, as developed over a period of time. From step 316, the routine also monitors for data entry errors such as misspellings in step 318. The data entry errors are compared with the normal patterns for data entry in step 320. Thus, in combinations, steps 310 through 320 collect characteristics unique to the user over a period of time and use this information to check that the current user exhibits a similar pattern to that shown over a period of time. This information is eventually used to provide a passive check into the characteristics of the current user. In step 322, in the event that the characteristic matches, the routine of FIG. 6 simply exits in step 326. Alternatively, if the characteristics do not match, the routine indicates a mismatch and generates appropriate warnings in step 324 before exiting in step 326.

In sum, the profiler of FIG. 6 runs silently in the background unless cumulative discrepancies raise a question as to the identity of the person taking the computerized examination. In such event, the profiler randomly selects one or more questions from the list of questions previously propounded to the student at the initialization. For instance the profiler requests the student type in certain sequences such as his or her name, telephone number and other personal information which is very familiar to the student and to which a predictable keystroke pattern response can be expected. In the event that the answer is not what the profiler expects, the profiler either shuts down the computer-aided training program and/or informs appropriate authorities of the potential question with respect to the student's account. If the profiler does not object to the identity of the student taking the computer-aided examination, the results of the test are stored in a remote database server for eventual uploading to the educational institution for appropriate issuance of grades. In this manner, the present invention provides an interesting and productive environment for the student to progress at his or her own pace. The invention also reduces the labor costs associated with the educational process through its passive monitoring of the examination process as well as active verification of the test-taker's identity when necessary.

Figure 7:
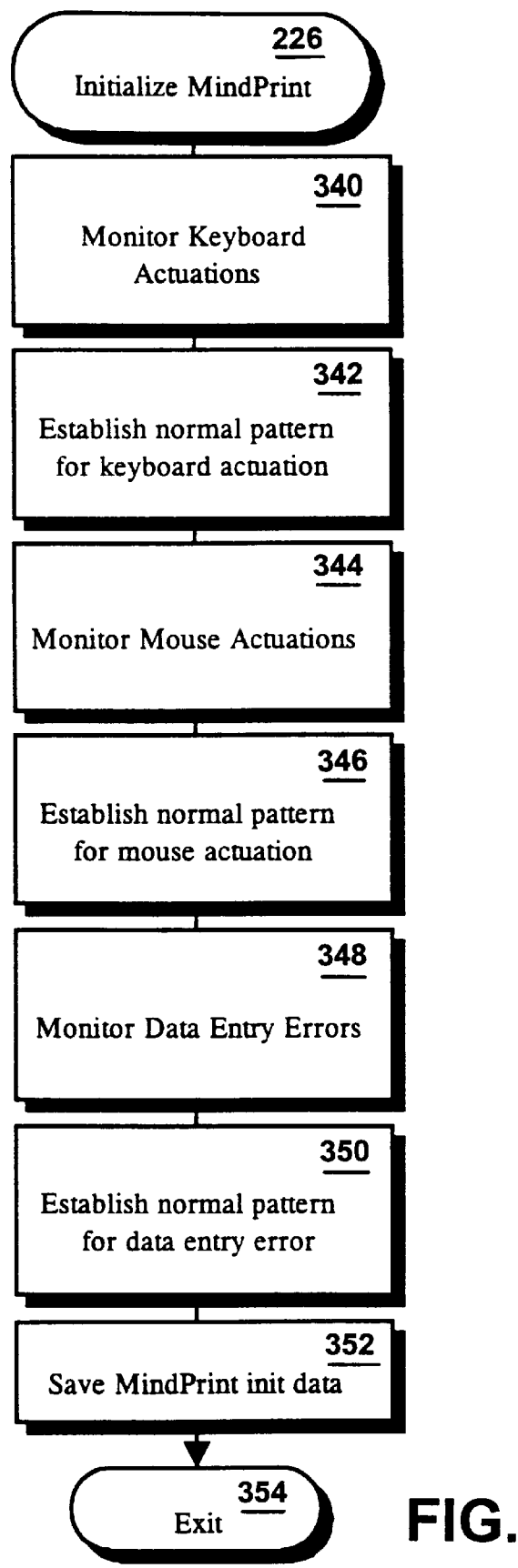
FIG. 7 is a flow chart illustrating in more detail the MindPrint initialization process.

Turning now to FIG. 7, the initialization of the MindPrint database is shown in more detail. In FIG. 7, from step 226 the routine generates a list of questions that are unique to the student. These questions include personal questions such as birth date, weight, parental history, and courses currently taken. This information is stored into a database. Additionally, while the student replies, the routine also initiates a characteristic capture mode in FIG. 7. Thus, from step 226, the routine proceeds to step 340 where the keyboard actuations are monitored. Over a period of time, the normal pattern is established for the keyboard actuation in step 342. Similarly, the mouse actuations are recorded in step 344, and a normal pattern is established in step 346. In addition, potential data entry errors that are repetitive of a particular individual, including the misspellings of a particular word, are monitored in step 348. In step 350 the normal pattern for data entry errors is established. In step 352, all of these characteristic data are stored into the MindPrint initialization database before the routine of FIG. 7 exits in step 354.

Thus, the computer-aided educational system of the present invention ensures a controlled test-taking methodology as well as a proper verification of the identity of the student taking the examination. The verifier operates to ensure that the student taking the examination is indeed the person who he or she claims to be. The verifier further deploys the profiler which, during the first session, propounds a list of questions highly specific to the student such only that student could be expected to answer those questions correctly in the future. Next, the profiler requests the student to type in certain sequences such as his or her name, telephone number and other personal information which is very familiar to the student and to which a predictable keystroke pattern response can be expected. These initialization information are captured and recorded on a database in a server on the Internet.

Furthermore, as the students interact with the computer training material of the present invention during each session, his or her activities are recorded and analyzed on a stroke-by-stroke basis. For instance, the profiler of the present invention monitors mouse movement and establishes a normal mouse movement and clicking pattern. Additionally, the profiler of the present invention monitors keyboard usage and forms a pattern indicative of the student taking the computer-aided training. Furthermore, the profiler of the present invention also performs an error pattern analysis consisting of consistent misspellings of particular words or consistent key stroke errors reflecting on the identity of the test-taker.

Although the present invention discloses the use of the video camera, the voice capture board, and the digitizer pad, the invention comtemplates that other identity input mechanisms can be used as well, including retinal and fingerprint scanners. Further, electronic identification cards such as an encrypted card can be inserted as additional means of identity verification. Furthermore, although the Wolfpack failover mode has been identified as preferred, the present invention contemplates that other modes of fail-safe computing may be used in the servers. Thus, the foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. An apparatus for verifying the identity of a user while said user operates a secure application, said user exhibiting one or more behavioral patterns unique to said user, said user exhibited behavioral patterns captured using one or more interface devices, said apparatus comprising:
   a habit capture system adapted to receive said user exhibited behavioral patterns, including one of response patterns to queries generated by the secure application, typing patterns, misspelling patterns, and mouse click patterns;
   a database coupled to said habit capture system, said database adapted to store predetermined habits and personal characteristics upon initialization of said database;
   a verifier coupled to said database and said habit capture system, said verifier sampling the user's behavioral patterns and comparing said behavioral patterns to said database, said verifier asserting an error signal when said user behavioral patterns and said database predetermined habits and personal characteristics fail to match; and
   a lock coupled to said verifier and to said application, said lock either generating a warning or ejecting said user from said secure application when said verifier asserts said error signal.

2. The apparatus of claim 1, wherein said database is stored on a server located on an Internet.

3. The apparatus of claim 1, wherein said habit capture system captures key stroke patterns.

4. The apparatus of claim 1, wherein said habit capture system captures mouse click patterns.

5. The apparatus of claim 1, wherein said habit capture system captures spelling patterns.

6. The apparatus of claim 1, wherein said secure application is an educational application.

7. The apparatus of claim 6, wherein said educational application further comprises teaching materials and test materials.

8. The apparatus of claim 7, wherein a portion or the entire teaching materials and test materials are encrypted.

9. The apparatus of claim 6, wherein said user has a student identification issued by an institution, further comprising:
   a grader coupled to said test materials, said grader propounding questions to said user, said grader further assigning a grade to said user based on said user's responses to said questions; and
   a grade reporter coupled to said grader and said institution, said grade reporter providing said grade to said institution.

10. The apparatus of claim 9, wherein said grade reporter is coupled to said verifier, said grade reporter notifying said institution when said verifier asserts said error signal.

11. A program storage device for verifying the identity of a user while said user operates a secure application, said user exhibiting one or more characteristics unique to said user, said user exhibited characteristics captured using one or more input devices, said program storage device comprising:
   a habit capture system adapted to receive said user exhibited characteristics, the characteristics including one of response patterns to queries generated by the secure application, typing patterns, misspelling patterns, and mouse click patterns;
   a database coupled to said habit capture system, said database adapted to store predetermined habits and personal characteristics upon initialization of said database;
   a verifier code coupled to said database and said habit capture code, said verifier code sampling the user's characteristics and comparing said characteristics to said database, said verifier code asserting an error signal when said user characteristics and said database predetermined characteristics fails to match; and
   a lock code coupled to said verifier code and to said application, said lock code either generating a warning or ejecting said user from said secure application when said verifier code asserts said error signal.

12. The program storage device of claim 11, wherein said habit capture code captures key stroke patterns, mouse click patterns, or spelling patterns.

13. The program storage device of claim 11, wherein said secure application is an educational application.

14. The program storage device of claim 13, wherein said educational application further comprises teaching materials and test materials.

15. The program storage device of claim 14, wherein said teaching materials and test materials are encrypted.

16. The program storage device of claim 14, wherein said user has a student identification issued by an institution, further comprising:
   a grader code coupled to said test materials, said grader code propounding questions to said user, said grader code further assigning a grade to said user based on said user's responses to said questions; and a grade reporter code coupled to said grader and said institution, said grade reporter code providing said grade to said institution.

17. The program storage device of claim 16, wherein said grade reporter code is coupled to said verifier code, said grade reporter code notifying said institution when said verifier code asserts said error signal.

18. A method for verifying the identity of a user while said user operates a secure application, said user exhibiting one or more characteristics unique to said user, said user exhibited characteristics captured using one or more input devices, said method comprising the steps of:

storing predetermined habits and personal characteristics into a database upon initialization;

capturing the user's exhibited habits and characteristics, the habits and characteristics including one of response patterns to queries generated by the secure application, typing patterns, misspelling patterns, and mouse click patterns;

verifying the captured habits and characteristics against the predetermined habits and characteristics stored in the database;

asserting an error signal when said user characteristics and said database predetermined characteristics fail to match; and generating a warning or locking the user from the application when the error signal is asserted.

19. The method of claim 18, wherein said capturing step receives key stroke patterns, mouse click patterns, or spelling patterns.

20. The method of claim 18, wherein said application is an educational application, further comprising the step of either generating a warning or locking said user out of said educational application when said error signal is asserted.

* * * * *

UNITED STATES PATENT AND TRADEMARK OFFICE
CERTIFICATE OF CORRECTION

PATENT NO. : 5,909,589
DATED : June 1, 1999
INVENTOR(S) : Parker et al.

It is certified that error appears in the above-identified patent and that said Letters Patent is hereby corrected as shown below:

```
Title page, item [56]
In U.S. Patent Documents,
Insert:
4,012,848  3/1997   Diament et al.       35/8
5,002,491  3/1991   Abrahamson et al.    434/322
5,508,690  4/1996   Shur et al.          340/825.16
5,572,668 11/1996   See et al.           395/183.14
5,601,432  2/1997   Bergman              434/118
```

Signed and Sealed this

Twenty-first Day of March, 2000

Attest:

Attesting Officer

Q. TODD DICKINSON

Commissioner of Patents and Trademarks